ated Jan. 25, 1955

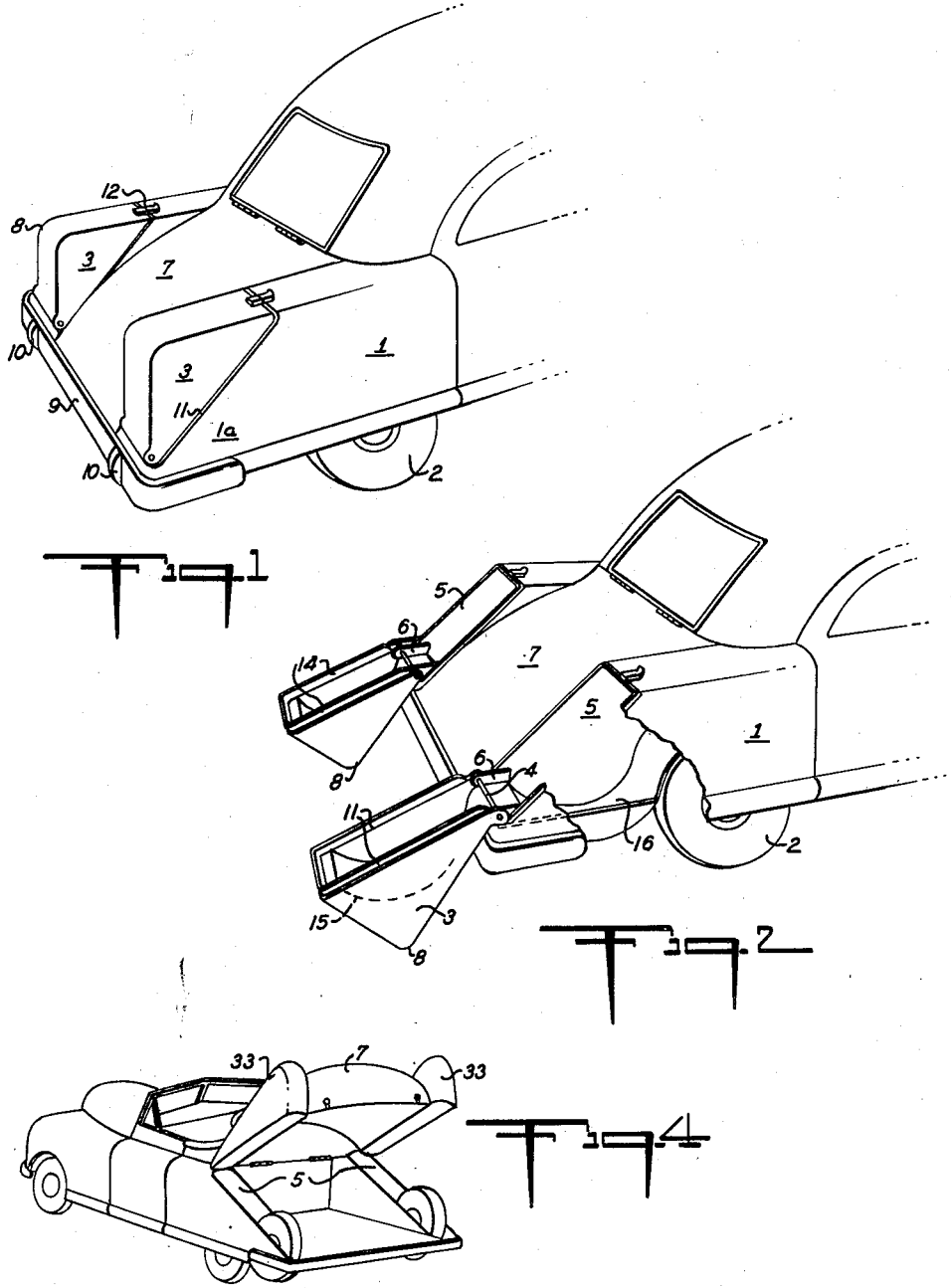

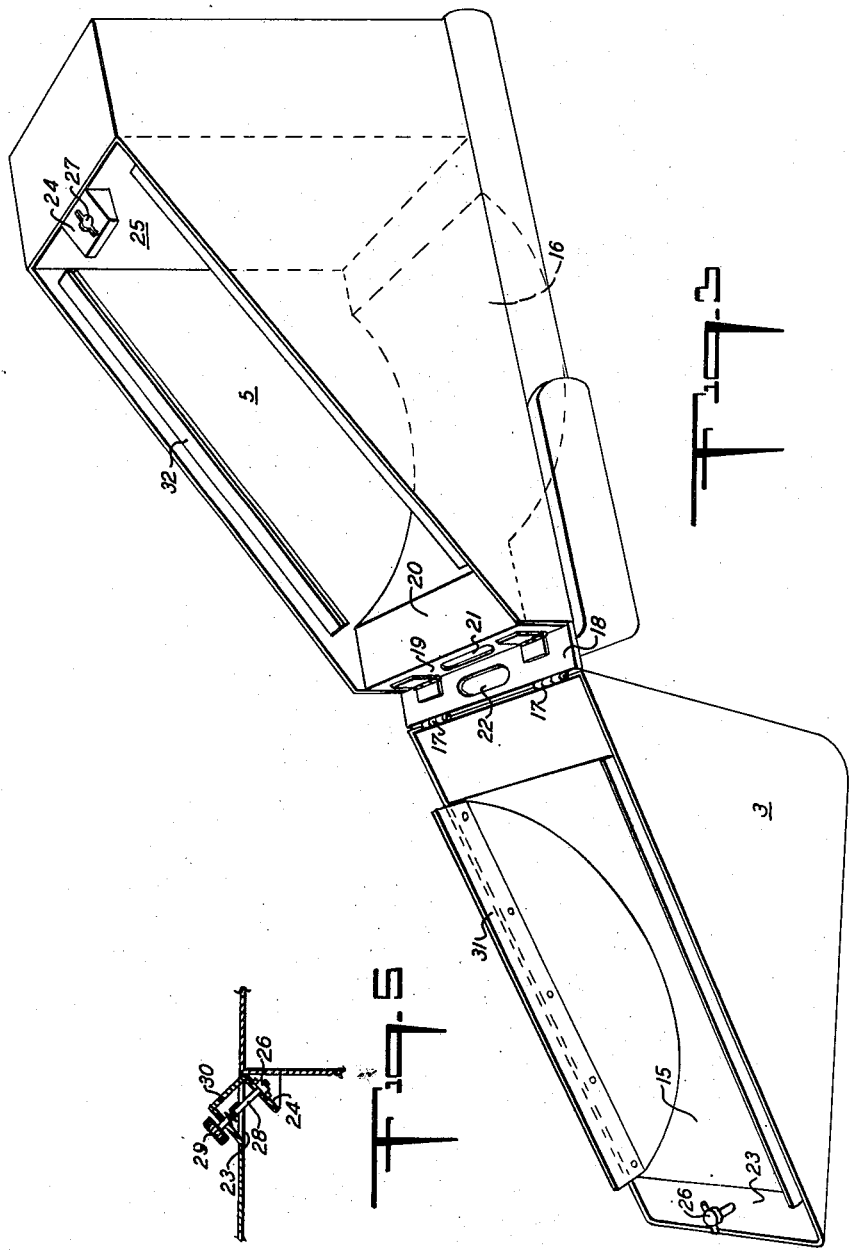

2,700,572

SPARE WHEEL MOUNT

William Robert Lincoln Torrance, Vancouver, British Columbia, Canada

Application December 14, 1951, Serial No. 261,642

Claims priority, application Great Britain December 18, 1950

5 Claims. (Cl. 296—37.2)

This invention relates to improvements in motor road vehicles and more particularly with a manner of adapting the trailing side part of a motor road vehicle for the accommodation of a spare wheel, tool kit, luggage or other suitable purpose so as to leave free for luggage carrying and other requirements substantially the full volume of the boot or like part of the vehicle.

The trend with modern motor road vehicles is to streamline or otherwise prolong the side panelling of the body rearwardly beyond the rear wheels in substantially linear or curvilinear continuity so as to provide a quite perceptible rearward overhang comprising side walls of a boot and a rear compartment for the accommodation of a spare tyre. This form of construction whilst enhancing the appearance, particularly in the streamline sense, of a vehicle, involves a waste of useful space, particularly as the present practice is to accommodate the spare wheel in the boot itself or in a compartment beneath the boot, and this makes it a difficult and heavy operation for removing and replacing the spare wheel. Also the presence of the spare wheel or pair of spare wheels in the boot sometimes involves locating the rear fuel tanks in a position which takes up space inside the boot. The object of the present invention is to obviate these disadvantages.

According to the present invention the rear side panelling of the body of the vehicle where it is prolonged beyond the part forming a guard for the rear wheel is itself shaped as a compartment for the accommodation of a spare wheel, this compartment preferably being duplicated on opposite sides of the vehicle so that two spare wheels or one spare wheel and kit or other suitable articles can be stowed directly in rear of the rear wheels of the vehicle, these compartments being normally closed by lids or hoods or integral lateral parts of the hood or top panel of the rear boot of the vehicle.

In order that the invention may be clearly understood and readily carried into effect drawings are appended hereto illustrating embodiments thereof, and wherein, Figures 1 and 2 are broken rear perspective views of one embodiment, showing respectively the lids opened and closed.

Figure 3 is a broken perspective view of a modification, and

Figure 4 is a rear perspective view showing an embodiment in which lid elements of compartments to accommodate spare wheels are integral with the boot lid.

Fig. 5 is a cross section through the locking device for the compartment lid shown in Fig. 3.

Referring to Figures 1 and 2 the rearwardly prolonged panelling or the like 1 of the parts of the body shrouding the upper parts of the road wheels 2 are shaped so as to form on opposite sides of the boot two separate and distinct compartments, the appropriate parts of the panelling 1 which are prolonged as at 1a beyond the wheel shrouding parts being closed at their rear ends by lids 3 hinged by cross bolts or pins 4 at their lower horizontal edges to the transverse lower horizontal end parts of the rear portions of compartments 5 which are slightly wider than the width of a road wheel and which are formed by the extensions 1a in streamlined or other suitable desired continuity with the parts 1 of the panelling acting as mudguards, the lids 3 when closed forming the desired rear terminal configuration of the side wings of the car. The hinge bolts or pins 4 can be secured at their ends in bracket plates 6 welded inside the compartments 5. It will be seen that the side wing portions 1a, each of which is shaped at its rear port to accommodate a spare wheel or other suitable equipment, project upwardly opposite sides of, and also may overhang rearwardly, the boot lid 7.

Each said lid 3 can, by means of the foregoing arrangement, be opened rearwardly, as shown in Figure 2, with the normally uppermost rear corner 8 thereof brought into contact with the ground or nearly in contact with the ground, it being preferred to avoid actual contact with the ground to obviate injuring the panelling, e. g. by abutting the rear vertical part of the lid against a transverse bumper or like portion 9 of the vehicle body, or against rubber stops or rubber padded over-riders 10 on the bumper 9 or a rear part of the vehicle body. Alternatively, a piece of rubber as a protective covering can be applied to the appropriate part of the lid where it engages the bumper or the like.

It will be seen from the foregoing that each lid 3 can be regarded as being of substantially triangular form in side elevation with the longest side 11, i. e. the base of a triangle extending diagonally across the side of the rearwardly prolonged portion of the mudguard panelling when the lid is closed, the upper horizontal edge of the lid being secured in the closed position by any suitable fastening device 12, the said opposed diagonal edges 11 of the lids, and 13 of the panel parts 1a being formed with overlapping lips, rubber sealing strips or other suitable sealing means which will not detract from the appearance of the vehicle but which will ensure a good close fit of the lid. For example, the interior faces of the lids can be lined with metal strips 14 which fit snugly into the walls of the compartments 5.

When a lid 3 is lowered to the open position it forms a form of ramp into which a spare wheel within the appropriate compartment 5 can be rolled when being removed for use or when being replaced, and when the lid is of substantially a triangular form in side elevation as mentioned above, it can be fitted internally with a false arcuate partition 15 which nearly or actually contacts the tread of the wheel when the lid is closed, and this partition will form the surface of the ramp upon which the wheel can be rolled. Also, it is preferred to provide at least in one of the compartments 5 an arcuate base 16 in which the wheel can rest.

If desired one or more springs, e. g. bowed springs, may be fitted to the ramp portion of the lid to bear against the tread of the tyre so as to hold the spare wheel in position and prevent vibration. Alternatively the said false partition 15 can itself be a flexible band anchored at its ends to the upper and lower horizontal edges of the lid, this anchorage at one or both ends if desired incorporating a coiled tension spring or springs so that the band will grip upon the tread of the wheel when the lid is closed, and also will absorb a certain amount of shock when the wheel is rolled on to the band when removing the wheel from the compartment.

The lids 3 may be hinged each as at 17 (see Figure 3) to a distance piece plate 18 which in turn is hinged to the rear of the base of the appropriate compartment 5 and normally seat vertically over a vertical partition member 19 across the rear of the compartment 5 to afford a good closure for the rear of the compartment. The partition member 19 may be the rear wall of a box 20 which can accommodate a tool kit and/or be provided in its member 19 with a rear light glass 21 exposed through another glass or an opening 22 in the plate 18, a lamp for the rear light being located inside the box 20. Alternatively, or in addition, the plate 18 can carry a number plate.

The free end of each lid 3 can carry a transverse web or plate 23 to abut against a stop bracket 24 affixed to a rear partition 25 of the compartment 5 or to a transverse bar across the rear of the compartment, the lid being locked by engaging a turnbutton head 26 in a hole 27 of the stop bracket 24, the turnbutton head 26 being carried by a spring loaded shank 28 fitted with a knob 29 bearing against a boss 30 formed on the lid. Internal metal strips 31 can be fitted to the side walls of each lid 3 to project within the appropriate compartment 5 and abut against rubber lined ledges 32 welded to the side walls of the compartments 5.

If desired the said lids can be fixed relative to the boot lid so that instead of being swung open downwardly rearwardly they will move upwardly integral with the lid to expose the wheels for removal. Such an arrangement is shown in Figure 4 in which lids 33 for the compartments 5 are formed integral with or permanently united to the boot lid 7. The side walls of the lids 33 can be provided at their edges with sealing strips similar to the members 31 of Figure 3.

As a further modification of the present invention, instead of the lids hinging on horizontal edges they can be adapted to be opened laterally individually by hinging them on the outer diagonal edges of the compartments 5, in which case the inner side walls of the lids can be fixed relative to the lid of the boot or other convenient part of the body and the lids constituted by the outer side walls and the tops of the lids.

As a still further modification the said outer and top walls of the lids can hinge on vertical axes slightly spaced in advance of or in close proximity to the foremost part of the appropriate spare wheel, so that the lids can swing outwardly and forwardly through approximately 180° about the vertical axis to the open position, the hinges being on opposed vertical edges of the lids and the panelling 1.

As a further modification in addition to being able to lift lids upwardly for exposing the rear wheel or wheels, in such an arrangement the base of the appropriate compartment or compartments can be adapted to swing downwardly about their forward front transverse edges to provide a ramp, the rear or free edges of these bases normally secured in position by interlocking with or resting upon flanges on the lower edges of the upwardly foldable lids.

An advantage arising out of the present invention is that the spare wheel and such other parts as may also be contained in one of the compartments, e. g. a jack, brace and other parts appropriate to the replacement of a spare wheel, will be spaced laterally outside the boot space so that full accommodation is afforded for stowing of luggage, and also if desired the petrol tank can be slung beneath the whole of the available space within the boot so as not to impede making full use of the space within the boot for luggage. Another advantage of the present invention is that where motor road vehicles are used in territory frequently demanding the use of wheel chains, two spare wheels can be carried in readily accessible positions with the chains fitted thereto without detracting from the space available for the stowage of luggage within the boot.

I claim:
1. In a motor road vehicle body in which the body panelling laterally overhangs the rear road wheels and is prolonged rearwardly beyond said rear road wheels, the provision of compartments in the said rearwardly prolonged panelling, said compartments being open to receive, and each dimensioned to accommodate a spare road wheel when arranged upright in rearward alignment with a rear road wheel supporting the vehicle body, each said compartment extending close to the rearmost part of the vehicle body and being divided diagonally into a part into which the spare tyre can be located vertically and a lid part which fits over the part of the tyre exposed beyond the said diagonal division, a boot between said compartments, and hinges connecting said lid parts pivotally at their lower rear transverse edges to the rear ends of the bases of said compartments to permit of rearward and downward opening of the lid parts to positions beneath and in rear of the compartments for the displacement into the lid parts of the spare wheels from the compartments.

2. A motor road vehicle body according to claim 1 wherein said lid parts each contains a false arcuate partition located in the lid part so as to be disposed close against and around the upper part of the tread of the tyre of a spare wheel within the compartment.

3. A motor road vehicle body according to claim 1, wherein said lid parts are secured by their normally rearmost transverse edges to normally substantially vertical rectangular rear plates hinged by their lower edges to the rear ends of the compartments.

4. A motor road vehicle according to claim 3, wherein said rear plates normally cover the rear walls of boxes formed across the rear ends of the bases of the said compartments.

5. A motor road vehicle according to claim 4, wherein said boxes are formed with rear light lenses in their rear walls, and the said hinged rear plates are formed with windows aligning with said rear light lenses.

References Cited in the file of this patent

UNITED STATES PATENTS

| | | |
|---|---|---|
| 2,063,598 | Franklin | Dec. 8, 1936 |
| 2,115,779 | Lyon | May 3, 1938 |

FOREIGN PATENTS

| | | |
|---|---|---|
| 54,947 | Netherlands | July 15, 1943 |
| 102,360 | Sweden | Aug. 19, 1941 |
| 629,724 | France | Aug. 2, 1927 |
| 631,921 | Great Britain | Nov. 11, 1949 |
| 961,328 | France | Nov. 21, 1949 |